(12) United States Patent
Renaud

(10) Patent No.: US 7,559,059 B2
(45) Date of Patent: Jul. 7, 2009

(54) METHOD AND APPARATUS FOR SMART DIRECTORIES FOR APPLICATION DEPLOYMENT

(75) Inventor: Benjamin Renaud, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 284 days.

(21) Appl. No.: 09/960,529

(22) Filed: Sep. 21, 2001

(65) Prior Publication Data

US 2003/0061247 A1    Mar. 27, 2003

(51) Int. Cl.
*G06F 9/44* (2006.01)
*G06F 15/177* (2006.01)

(52) U.S. Cl. ...................... 717/174; 709/220
(58) Field of Classification Search ........... 717/100, 717/103, 109, 168, 170–178; 714/26, 38; 707/103 R, 4, 10, 200–203; 709/203, 208, 709/217, 219, 221, 245
See application file for complete search history.

(56) References Cited

U.S. PATENT DOCUMENTS

| | | | | |
|---|---|---|---|---|
| 5,564,051 | A | 10/1996 | Halliwell et al. | 395/600 |
| 5,581,764 | A | 12/1996 | Fitzgerald et al. | 395/703 |
| 6,202,207 | B1 | 3/2001 | Donohue | 717/11 |
| 6,351,776 | B1* | 2/2002 | O'Brien et al. | 709/245 |
| 6,425,126 | B1 | 7/2002 | Branson et al. | 717/168 |
| 6,557,100 | B1* | 4/2003 | Knutson | 713/100 |
| 6,757,708 | B1* | 6/2004 | Craig et al. | 709/203 |
| 2002/0104071 | A1 | 8/2002 | Charisius et al. | |
| 2003/0005166 | A1* | 1/2003 | Seidman | 709/310 |
| 2003/0018950 | A1* | 1/2003 | Sparks et al. | 717/100 |
| 2003/0055927 | A1* | 3/2003 | Fischer et al. | 709/221 |

OTHER PUBLICATIONS

Bea, WebLogic Server 5.1 EJB Deployment Properties, Jun. 25, 2001, Programming WebLogic Enterprise JavaBeans, e-docs.bea.com, p. 1-19, URL: http://web.archive.org/web/20010625015058/edocs.bea.com/wis/docs60/ejb/EJB_refernencence.html.*
WebLogic Server 6.0, Deploying EJBs in the EJB Container, Programming WebLogic Enterprise JavaBeans, e-docs.bea.com, pp. 1-5, archive copy Apr. 17, 2001- URL: http://web.archive.org/web/20010417134926/http://e-docs.bea.com/wis/docs60/ejb/deploy.html.*
Osel, et al., "OpenDist-Incremental Software Distribution", Proceedings of the 9th Usenix Conference on System Administration, Sep. 18, 1995, pp. 181-193.
"RDIST", FreeBSD General Commands Manual, 4.4 Release, Mar. 17, 1994, 6 pages.
Bosch, "Actualization and Patchinstallation by means of rdist", Jun. 19, 1996, 2 pages, retrieved from: http://www.xinux.de/docs/betriebsysteme/solaris/node31.html.
Supplementary European Search Report for EP 02759737 dated Jun. 22, 2007, 2 pages.

* cited by examiner

*Primary Examiner*—Tuan Anh Vu
(74) *Attorney, Agent, or Firm*—Fliesler Meyer LLP

(57) ABSTRACT

Applications are automatically deployed in a distributed computing environment through the use of Smart Directories. In an embodiment, Smart Directories are a repository for copies of the applications currently deployed in the distributed computing environment. The Smart Directories are monitored by the distributed computing environment. New applications added to the Smart Directories are automatically deployed. Applications modified in the Smart Directories are automatically redeployed. Applications removed from the Smart Directories are automatically undeployed. The Smart Directories can automatically deploy applications packaged as a single file or unpackaged as several component files.

35 Claims, 3 Drawing Sheets

METHOD AND APPARATUS FOR SMART DIRECTORIES FOR APPLICATION DEPLOYMENT

FIELD OF THE INVENTION

This invention relates to a method of automatically deploying, undeploying, and redeploying applications and application components across a distributed computing environment.

BACKGROUND OF THE INVENTION

A distributed computing environment is comprised of a group of networked computers working in concert to provide a variety of computing services. In this type of computing environment, software applications are separated into many application components. These components are distributed to server applications located on one or more networked computers, so that different components are executed by different server applications within the distributed environment. The application components are designed to effectively operate in a distributed environment. The advantage of designing applications for a distributed computing environment include increased scalability to accommodate a large numbers of users, increased reliability, and efficient use of computing resources One example of a distributed computing environment is the Java™ 2 platform, Enterprise Edition (J2EE) architecture, which was developed by Sun Microsystems. J2EE applications are comprised of primarily of Enterprise Java™ Beans (EJB), which are self-contained, reusable application components written in the Java™ programming language. The specification for the J2EE architecture is described in Java™ 2 Platform Enterprise Edition Specification, v1.3, available at http://java.sun.com/j2ee/j2ee-1_3-pfd4-spec.pdf and incorporated by reference herein.

In the J2EE architecture, application components are executed within an application server program installed on each computer in a distributed computing environment. The application components for an application can be spread over many application servers within the distributed computing environment, or concentrated within a single application server.

The J2EE application server program provides low-level functionality needed by application components in an distributed programming environment. The functions provided by the J2EE application server program include enabling communication between the distributed application components, as well communication between different applications located within the distributed computing environment or outside this environment. The application server handles systems resources, threads, memory, database connections, security, client connectivity, and transaction management. The application server also manages the installation and removal of J2EE applications. This includes the distribution of application components to application servers in the distributed computing environment. By integrating these functions into the application server, the J2EE platform allows application developers to concentrate on implementing the business logic of the application, rather than low-level functionality required by distributed applications.

Although the J2EE application platform is designed to eliminate many of the complexities associated with developing distributed applications, software development with this programming paradigm remains complex and difficult. One of the difficulties associated with the development of J2EE applications is the problem of deployment. Deployment is the process of installing the various application components comprising an application on the application servers within a distributed computing environment. An explanation of the structure of a J2EE application is helpful in understanding the complexities associated with deploying a J2EE application.

FIG. 1 shows a typical structure of a fully packaged J2EE application. A J2EE application in this form is ready to be installed in a distributed computing environment. The packaged J2EE application is contained in an Enterprise Application Archive file (.EAR) 100. The .EAR file contains the J2EE application 107 and a J2EE application deployment descriptor (DD) 105. The J2EE application 107 contains one or more application components. These application components may be Enterprise Java™ Beans, 111, 110, and 112; J2EE client applications 120, 121, and 122; or web components, 130, 131, and 132. The deployment descriptor 105 is a file that describes the attributes of the J2EE application, such as transaction attributes or security authorizations. In an embodiment, the deployment descriptor is encoded in Extensible Markup Language (XML), a language widely used for describing information. Additional deployment descriptors may be used to describe individual components of the J2EE application.

Enterprise Java™ Beans (EJB's) are contained in a Java™ Archive (.JAR) file, as shown in detail in 110. A .JAR file bundles multiple files together in a single archive file. Typically, a .JAR file contains the Java™ class files and auxiliary resources associated with an application component. For an EJB, the .JAR file contains an EJB deployment descriptor 113, one or more EJB .class files 115, and any auxiliary resources required by the EJB application component 115. The class file contains the software code necessary to implement the operation of the EJB. The EJB deployment descriptor 113 describes the attributes of the EJB .class files and associated resources 115. Like the J2EE application deployment descriptors, the EJB deployment descriptor may also be encoded as an XML file. A J2EE application may contain any number of EJB .JAR files, and the three EJB .jar files 110, 111 and 112, shown in FIG. 1 are for illustration only and are not intended to be an upper nor a lower limit.

The J2EE application 107 may also contain J2EE client applications 120, 121 and 122. J2EE client applications perform functions on a user's computer and provide an interface to the J2EE Application. A J2EE application may contain any number of J2EE client application files, or alternatively, none at all. Like Enterprise Java™ Beans, these application components are also contained in .JAR files. As shown in the .JAR file 120 of FIG. 1, the J2EE client application is comprised of a J2EE client application 125, and a J2EE client application deployment descriptor 123. The J2EE client application 125 is comprised of one or more J2EE .class files, which contain the Java™ code implementing the functions of the J2EE client application. The J2EE client application 125 may also contain any auxiliary resources required by the J2EE client application. The J2EE client application deployment descriptor 123 details the attributes of the J2EE client application 125.

The J2EE application 107 also includes one or more web components. Web components are server-side objects used by the J2EE application to communicate with web-based clients. These objects process web-based user requests and generate static or dynamic content for the user in response. For example, web components allow a J2EE application to display customized web pages for each user.

Web components are contained in the .WAR files 130, 131 and 132. As shown in more detail in file 130, a .WAR file contains a web component 135 and a web component deployment descriptor 133. The web component deployment descriptor 133 is a .XML file describing the web component. Web component 135 consists of one or more types of web component files packaged together. Examples of web components include Java™ server page (.JSP) files, Java™ servlet .class file, hypertext markup language files (.HTML) files, or a graphics interchange format (.GIF) files.

Deploying a J2EE application requires several steps. First, the user must package each of the numerous application components, such as those disclosed in FIG. 1, into a .JAR file or a .WAR file. After packaging each application component into a separate file, the user must assemble the application component files into a single J2EE application (.EAR) file. Once the fully packaged J2EE application file has been created, the user installs the complete .EAR file onto the J2EE application server using a software application. This application requires the user to manually select the J2EE application to be deployed and the application server or servers on which to deploy the application.

The process of packaging application components into .JAR or .WAR files, and then into .EAR files can be very time-consuming. A large J2EE application may have over 500 different application components which need to be assembled in a .EAR file before deploying the application. If a software developer modifies even a single one of these application components, the entire process of packaging the .EAR file must be repeated. The packaging process can be wasteful with small applications as well. If a J2EE application contains only a single application component, this single application component is first packaged in a .JAR file. The resulting .JAR file is then further packaged in a .EAR file. This double packaging of a single application component wastes the software developer's time and provides no advantage in deploying the J2EE application.

Since deploying a J2EE application in a distributed computing environment involves a series of complicated packaging and distribution steps, the deployment of a new application is a difficult task for software administrators. The software administrator must use a separate software application to manually designate the application servers on which the application is to be deployed, and then manually initiate the deployment process. This process must be repeated whenever the software administrator wishes to deploy a revised or updated version of the application. Furthermore, the software administrator must manually undeploy the old application from the application server.

For software developers, the complicated application deployment process hinders software development. In software development, a developer may have to make frequent changes to the application source code. After each change, a developer must repeat the same arduous deployment process in order to test the application in development. This significantly increases the time and difficulty in developing a J2EE application.

Therefore, it is desirable to have a distributed computing environment which 1) automatically deploys new or updated applications to one or more computers in a distributed computing environment, 2) automatically undeploys unneeded or outdated applications or application components from one or more computers in a distributed computing environment, and 3) automatically deploys application components to one or more computers in a distributed computing environment without superfluous packaging steps.

SUMMARY OF THE INVENTION

According to the invention, generally, a distributed computing environment is adapted to perform a method for automatically deploying an application in a distributed computing environment. This distributed computing environment may include a single computer or a plurality of computers. Each computer may contain one or more application servers for executing applications or application components. An embodiment of this method automatically scans an application directory to locate an undeployed application. This method recognizes an undeployed application in the application directory and deploys this application to at least one application server in the distributed computing environment.

In an embodiment, the method scans the application directory to obtain a list of all the applications stored in the application directory. This embodiment then compares the list of applications with a list of previously deployed applications in order to select the applications to be deployed.

In a further embodiment, the method identifies modified applications by examining a deployment indicator associated with the application. The deployment indicator may be an attribute of a file containing the application, or alternatively, an attribute of a file separate from the file containing the application. Modified applications are redeployed to at least one computer in the distributed computing environment.

In an embodiment, the method scans the application directory to obtain a list of all the applications stored in the application directory. This embodiment then compares the list of applications with a list of previously deployed applications. Previously deployed applications absent from the application directory are undeployed from the distributed computing environment.

Other embodiments and advantages of the present invention can be seen upon review of the figures, the detailed description, and the claims which follow.

BRIEF DESCRIPTION OF THE FIGURES

The present invention will now be described with reference to the drawings, in which.

The invention will be better understood with reference to the drawings and detailed description below. In the drawings, like reference numerals indicate like components.

DETAILED DESCRIPTION

Figure 1:
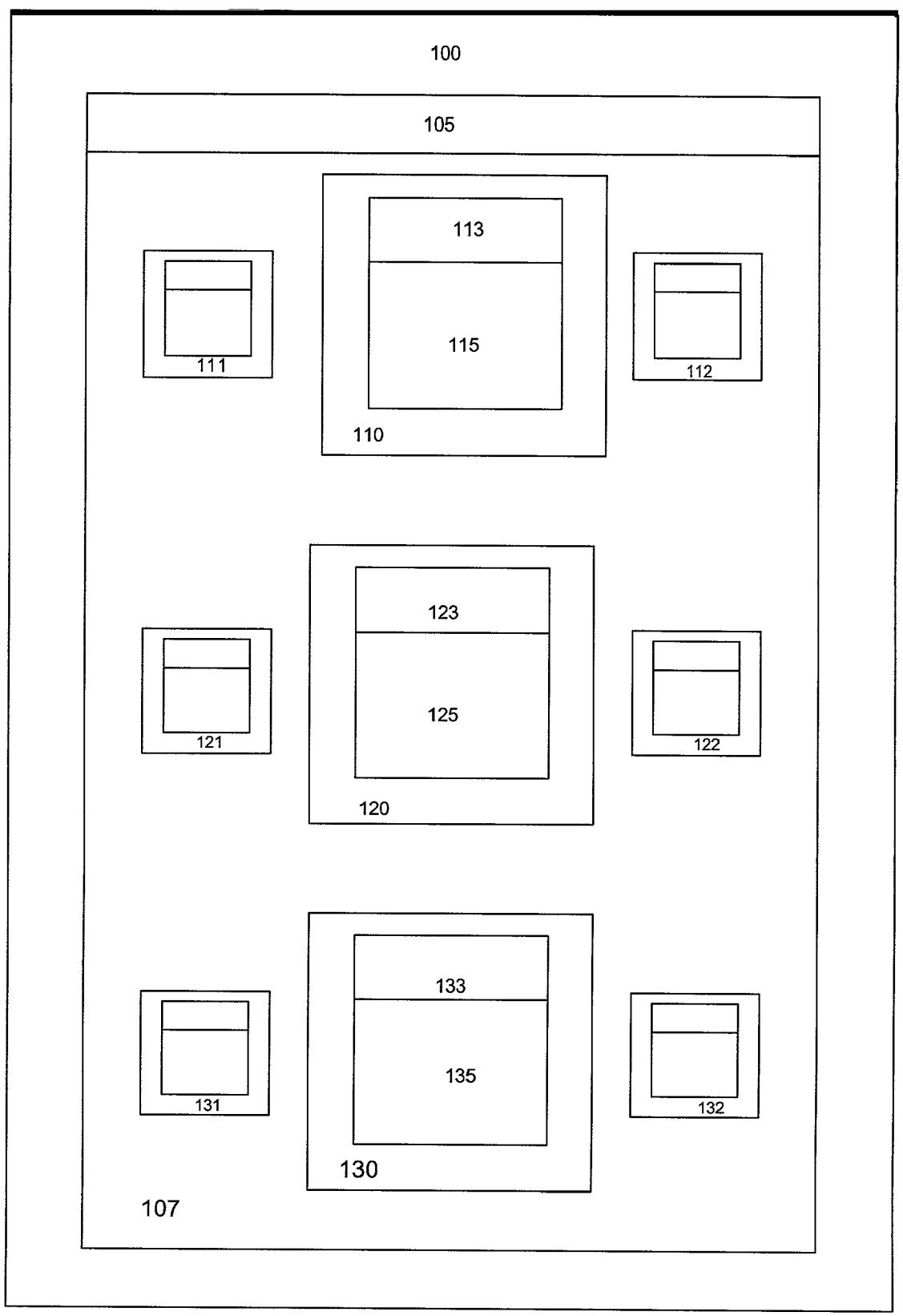
FIG. 1 illustrates the structure of a fully packaged J2EE application.

The invention addresses the shortcomings of prior distributed computing environments by automatically deploying and undeploying applications and application components as needed. An embodiment of the invention achieves these goals through the use of an application savvy file directory or set of directories. These application savvy directories, referred to as Smart Directories, are a repository for copies of the applications and application components currently deployed in the distributed computing environment. Like ordinary file directories, the Smart Directories are employed to organize information files, such as files associated with applications or application components, on a data storage device. Additionally, Smart Directories may be nested inside other Smart Directories directories. Although multiple Smart Directories may be used, an embodiment of the invention requires only a single Smart Directory in the distributed computing environment.

In an embodiment, the Smart Directory is in communication with at least one computer within the distributed computing environment. This enables a server program in the distributed computing environment to monitor the contents of the Smart Directory. Upon the detection of a new application files in the Smart Directory, the distributed computing environment deploys the application or application component associated with this new file automatically. The Smart Directories also detect the deletion of an existing file and undeploy the application or application component associated with the deleted file automatically. Finally, the Smart Directories detect the replacement of an existing file with a newer version of the file and automatically redeploy the application or application component associated with the new version of the file. This enables a user to change the deployment of a distributed application by simply adding, deleting, or updating the application file in the Smart Directory, rather than performing a series of explicit configuration steps.

An example embodiment of the invention is adapted to operate within the distributed computing environment defined by the J2EE architecture. In this embodiment, the Smart Directories are in communication with at least one application server in the J2EE distributed computing environment. The Smart Directories contain all of the files associated with all of the J2EE applications deployed on any of the application servers in the J2EE distributed computing environment. This embodiment automatically deploys, undeploys, and redeploys J2EE applications when the corresponding application files in the Smart Directories are added, removed, or updated.

In a further variation of this embodiment of the invention, the Smart Directories are capable of deploying J2EE applications and application components to application servers without an explicit packaging step. Rather than deploying a J2EE application packaged as a J2EE .EAR file, the Smart Directories can deploy a J2EE application separated into its constituent files. These files may include J2EE client application .JAR files, EJB .JAR files, and web component .WAR files. This ability to deploy unpackaged files extends to J2EE application component files as well. Since .JAR and .WAR files are themselves comprised of many files bundled together, the Smart Directories can deploy application components separated into constituent files, such as .class files, .GIF files, .XML files, .HTML files, .JSP files, or any other type of file associated with an application component.

Smart Directories allow users to deploy unpackaged J2EE applications and application components in a similar way as their packaged counterparts. The user simply adds, removes, or modifies the unpackaged file in the Smart Directory. The Smart Directory then deploys, undeploys, or redeploys the application component in response. In an embodiment, all of the constituent files of each application or application component are contained within a separate directory or subdirectory. This makes it easier for the user to identify the group of files associated with each application or application component. It also allows the user to easily manipulate the files associated with an application or application component without disturbing the other applications or application components. The separate directories or subdirectories are also Smart Directories. In an embodiment, any subdirectory created within a Smart Directory is automatically treated as a Smart Directory as well.

Figure 2:
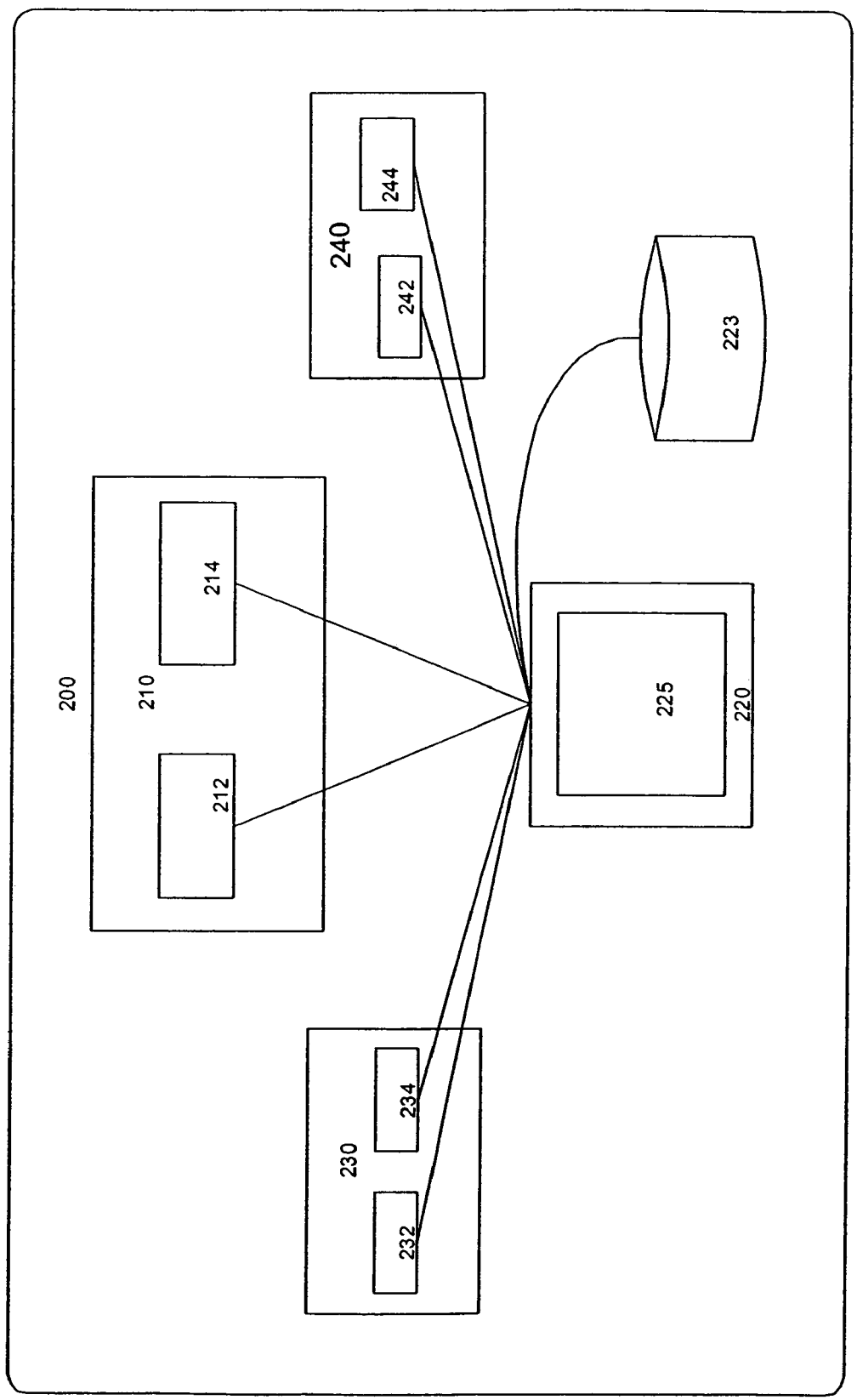
FIG. 2 illustrates a distributed computing environment employing an embodiment of the invention.

FIG. 2 shows a distributed computing environment incorporating an embodiment of the invention. The distributed computing environment 200 contains a plurality of computers 210, 220, 230, and 240. The four computers shown are for the purpose of illustration. A distributed computing environment may contain a single computer up to any number of computers. Each of the computers contains the underlying hardware and software necessary to operate in a distributed computing environment. This includes one or more processing devices, memory devices, data storage devices, communications devices, and any associated software. The usage of these hardware and software components in a distributed computing environment are well known in the art. Although not shown in FIG. 2, the distributed computing environment 200 may include communication connections for exchanging information with external systems external systems such as client computers, databases and other enterprise systems, monitoring systems, and data storage systems.

All of the computers in the distributed computing environment 200 are in communication with each other via communication link 250. Communication link 250 may be a computer network, such as a local area network or a wide area network, and may employ any type of communications technology capable of carrying information. The number and arrangement of the communication connections comprising communication link 250 shown in FIG. 1 is for purposes of illustration and communication link 250 may be configured in any suitable manner known in the art for connecting computers.

Computer 210 contains server programs 212 and 214. Each of these server programs is capable of independently executing one or more distributed applications or application components. Server programs 212 and 214 are shown in FIG. 2 for the purposes of illustration and computer 210 may contain a single server program up to any number of server programs. Similarly, computers 230 and 240 contain server programs 232, 234, 242, and 244, respectively. In an embodiment, each server program is a J2EE application server capable of executing one or more J2EE applications or application components.

Computer 220 contains an Admin Server program 225. The Admin Server 225 supervises the deployment, undeployment, and redeployment of distributed applications or application components. In an embodiment, a single Admin Server 225 performs this function for the entire distributed computing environment 200. Computer 220 may also contain other programs not shown in FIG. 2. In an embodiment, computer 220 contains an Admin Server 225 as well as one or more server programs, such as those discussed above.

Computer 220 is also in communication with Application Storage 223. Application Storage 223 is a storage device capable of storing and retrieving files associated with applications and application components. The Admin Server 225 is capable of accessing the contents of Application Storage 223 in order to deploy, undeploy, or redeploy applications or application components. Application Storage 223 may also be accessible to users through computer 220 or alternatively through another computer in the distributed computing environment. In an embodiment, Application Storage 223 is a portion of a general purpose storage device in communication with computer 220.

In an embodiment, files associated with applications and application components are stored in one or more Smart Directories located on Application Storage 223. The Smart Directories are implemented as one or more standard file directories similar to those employed in connection with general purpose storage devices. The Smart Directories contain a copy of every file associated with applications and application components deployed in a distributed computing environment. The contents of the Smart Directories are monitored by the Admin Server 225 in order to handle the deployment, undeployment, and redeployment of applications and application components.

Figure 3:
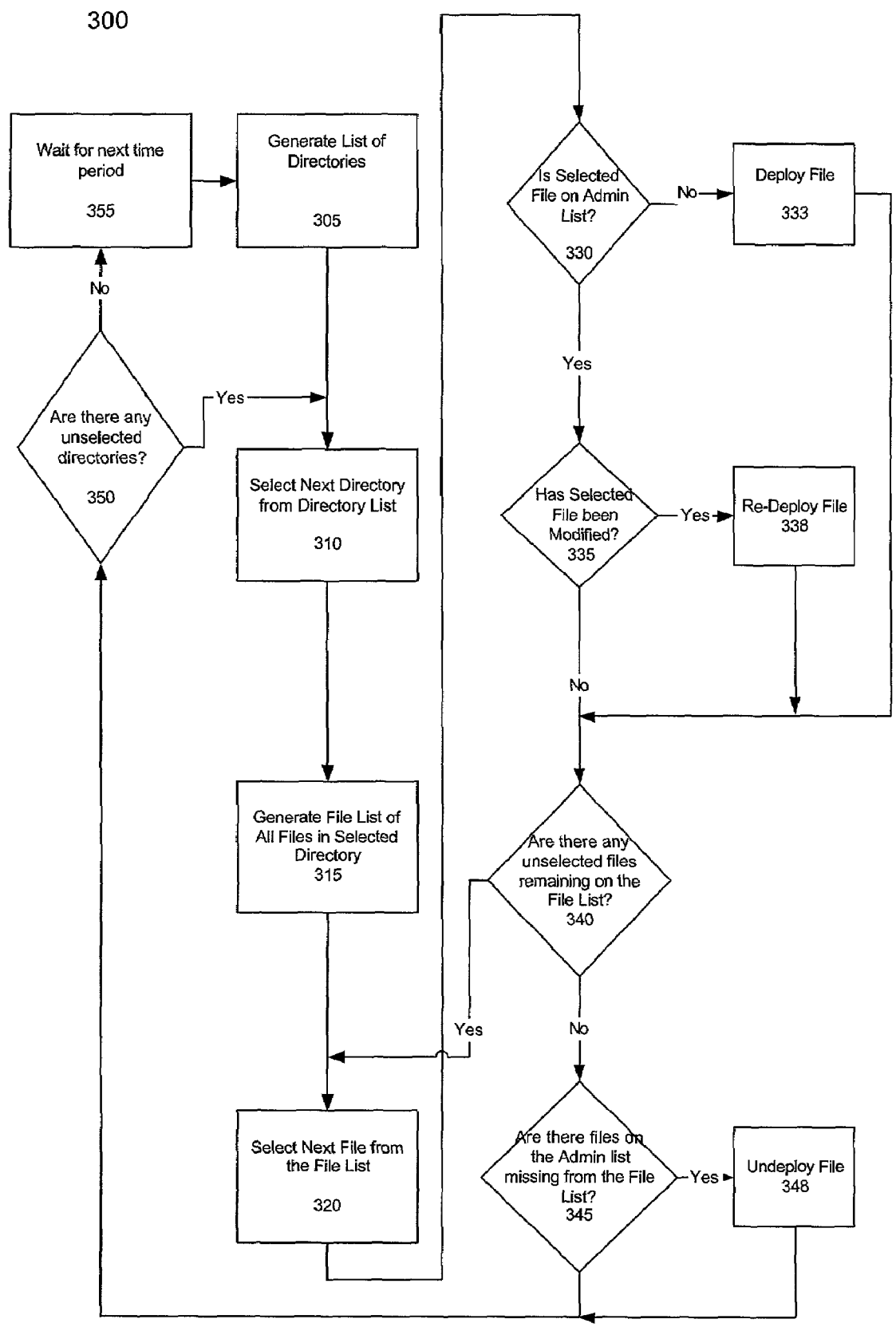
FIG. 3 illustrates an embodiment of a method according to the invention.

FIG. 3 shows an embodiment of the monitoring process 300 used by the Admin Server 225. In this embodiment, Admin Server 225 examines the contents of the Smart Directories at periodic intervals. This examination begins by first retrieving a list of all the Smart Directories at step 305. In an embodiment, this list is generated from a user supplied list of file directories designated as Smart Directories. Alternatively, one or more Smart Directories may be predetermined by the initial configuration of Admin Server 225. A further embodiment may automatically designate subdirectories within a Smart Directory as Smart Directories themselves. In this embodiment, the Admin Server 225 recursively scans each of the Smart Directories to locate all of the subdirectories, so that the directory list in Step 305 will include the Smart Directories and all of their subdirectories.

At step 310, the Admin Server 225 selects the next directory from the directory list. Step 310 is the first step in a processing loop repeated by the Admin Server 225 for each directory on the directory list. If this is the first iteration of the Admin Server 225 through this loop, the Admin Server 225 will select the first directory from the directory list. Otherwise, the Admin Server 225 will select the next directory from the list. The directories on the directory list may be arranged in any order provided that all of the directories on the directory list are eventually selected and processed by the Admin Server 225. In an embodiment, the directories on the directory list may be arranged to optimize speed of operation, memory usage, or access to Application Storage 223.

Admin Server 225 retrieves a list of all of the files located within the selected directory at Step 315. The file list may include files associate with complete applications or application components. In an embodiment, the files may contain complete J2EE applications, either as a packaged .EAR file or separated into the individual files for each application component of the J2EE application. The application component files may be packaged as .JAR or .WAR files or may be further separated into individual files, such as Java™ .class files, .xml deployment descriptors, .HTML files, .GIF image files, .JSP Java™ server page files, or any other type of file associated with the deployment of an application component in an distributed computing environment. In the case of unpackaged application or application component files, an embodiment of the Admin Server 225 will assume that all of the unpackaged files in a subdirectory are associated with a common application or application component.

At step 320, the Admin Server 225 selects the next file from the file list. Step 320 is the first step in a processing loop repeated by the Admin Server 225 for each file on the file list. If this is the first iteration of the Admin Server 225 through this loop, the Admin Server 225 will select the first file from the file list. Otherwise, the Admin Server 225 will select the next file from the file list. The files on the file list may be arranged in any order provided that all of the files on the file list are eventually selected and processed by the Admin Server 225. In an embodiment, the files on the file list may be arranged to optimize speed of operation, memory, or access to Application Storage 223.

At Step 330, Admin Server 225 compares the selected file to an internally maintained administrative list. The administrative list is a list of all of the files associated with the applications and application components currently deployed in the distributed computing environment 200. In an embodiment, the administrative list is constructed in previous iterations of the Admin Server 225 during deployment of applications and application components. This is discussed in more detail below. If there are no files on the administrative list, then there are no applications or application components currently deployed in the distributed computing environment 200.

The Admin Server 225 examines the administrative list to determine if the selected file is already on the administrative list. The absence of the selected file from the administrative list indicates that the application or application component associated with the selected file has not been deployed. The deployment of the application or application component associated with the selected file is then carried out by Step 333. The process of deployment is discussed in further detail below. Further, Step 333 adds the selected file to the administrative list following the successful completion of the deployment. In this manner, the administrative list is created and updated.

If the selected file is already located on the administrative list at Step 330, then at Step 335 the Admin Server 225 determines whether the selected file contains an application or application component modified from the version which has been previously deployed. This can be determined through any commonly used method for identifying versions of software or software components, such as the use of version numbers, file checksums, or other identification methods. Information necessary for this identification may be stored on the administrative list. If the selected file has been modified from its counterpart on the administrative list, then the application or application components associated with the selected file are redeployed in Step 338, which is discussed in further detail below. If information from the administrative list is used to identify a modified file, then this information is updated following successful completion of the redeployment. In this manner, the administrative list is updated with the most recent version of deployed applications and application components.

In an embodiment, the administrative list contains not only the names of the files associated with previously deployed applications and application components, but also the date of each file as well. In many common file systems, every file has a corresponding date which is modified whenever the file is updated. In this embodiment, the Admin Server 225 compares the date on the selected file to the date of the corresponding file stored on the administrative list. A more recent date on the selected file than its counterpart on the administrative list indicates that the application or application component associated with the selected file has been updated since its deployment and redeployment of the application or application component is required. Redeployment is carried out in Step 338.

Following the deployment or redeployment, if necessary, of the application or application components associated with the selected file, at Step 340 the Admin Server 225 checks to see if there are any files remaining on the file list which have not yet been selected. Steps 320 through 340 are repeated for each of the unselected files from the file list. If all of the files from the file list have already been selected, the Admin Server 225 examines the administrative list at Step 345. The Admin Server 225 locates files on the administrative list whose counterparts are missing from the file list for the selected directory.

This indicates that a file associated with an application or application component has been deleted from the Smart Directory. Consequently, the corresponding application or application component should be undeployed from the distributed computing environment 200. Undeployment of all the applications and application components associated with files on the administrative list and absent from the file list is carried out in Step 348, which is discussed in further detail below. Following successful undeployment of an application or application component, the selected file is removed from the administrative list.

Following the optional undeployment of applications or application components, the Admin Server 225 checks to see if there are any previously unselected directories on the directory list in Step 350. Steps 310 through 350 are repeated for each unselected directory on the directory list. If there are no more directories left to select, the Admin Server 225 waits for a period of time at Step 355 before starting the monitoring process again. In an embodiment, this period of time is 3 seconds.

The Steps of Deployment 333 and Redeployment 338 enable an application or application component to operate on one or more server programs in the distributed computing environment 200. Although the specific details of these processes will vary depending on the architecture of the distributed computing environment, in general, deployment and redeployment on a server program requires the application or application component to be stored in the memory associated with a server program and to be configured to operate in the distributed computing environment. The Undeployment Step 348 is generally the reverse of the deployment process. Since this embodiment of the invention is directed towards the automatic selection of applications and application components for deployment or undeployment, rather than the deployment process itself, the details of this process are largely unchanged by operation of this embodiment, regardless of the type of distributed computing environment.

In an embodiment of the invention adapted to a J2EE distributed computing environment, deployment may include the additional compilation of Enterprise Java™ Beans or Java™ Server Pages, configuration of the security, transaction, and operating environments, and registration of the application components and resources with a JNDI naming service. The Java™ Naming and Directory Interface (JNDI) is a standard Java™ language extension for locating Java™ objects. In an embodiment of a J2EE distributed environment, the application server requests a copy of the application or application component to be deployed via an HTTP request. This request is received by a Java™ servlet, which responds with the specific application or application component.

In a further embodiment of the invention adapted to a J2EE distributed computing environment, a configuration file in communication with the Admin Server 225 stores information about the entire distributed computing environment 200. This includes information about each computer, application server, application, application component, and any other manageable entity in the distributed computing environment 200. This configuration file also includes information for distributing applications and application components to different application servers within the distributed computing environment 200. The distribution of applications and application components within the distributed computing environment 200 may be determined by the resources and capabilities of each application server. Applications and application components are deployed to different application servers based upon the configuration information.

An embodiment of the configuration file is an XML data file. This file stores the configuration information of the distributed computing environment as a series of XML data tags. In an embodiment, this configuration information may be manually created by a user. The configuration file includes XML data tags for each application in the distributed computing environment. Each application XML data tag contains a series of XML tags corresponding to each application component associated with the application. These application component XML tags designate where the respective application component is to be deployed. Each application component XML tag may designate a specific application server, a group of application servers, or every application server in the distributed computing environment.

As an example of the use of an XML configuration file, the following sample application XML tag will be discussed in more detail.

<Application Name="Foo" URI="somepath">
    <EJBComponent Name="bar" URI"bar.jar" Targets="MyServer"/>
    <WebAppComponent Name="baz" URI="baz.jar" Targets="MyDomain"/>
</Application>

This in an application XML tag for a sample application called "Foo." The application XML data begins with the tag <Application> and ends with the tag </Application>. The <Application> tag further contains a 'Name' attribute, which is set to "Foo." Other attributes may be included in this tag, such as 'URI', which designates the location of the "Foo" application. Between the two <Application> tags are application component XML tags. The first application component tag is <EJBComponent>. This XML tag designates a EJB application component associated with the 'Foo' application named 'bar'. According to its application component XML tag attributes, the 'bar' application component is contained in the 'bar.jar' file and should be deployed on the application server 'MyServer.' Similarly, the second application component XML tag designates a web component 'baz' contained in the file 'baz.jar.' For this application component, setting the 'Target' attribute to 'MyDomain' designates the deployment target for this component to be the entire distributed computing environment.

Upon the initial activation of the Admin Server 225, each of the entities described in the configuration file is converted by the Admin Server 225 into an MBean. An MBean is an Enterprise Java™ Bean compliant with the Java™ Management Extensions (JMX) standard. The specification for the Java™ Management Extensions standard is located at http://java-.sun.com/aboutJava/communityprocess/final/jsr003/index.html and is incorporated herein by reference. In this embodiment, the deployment, redeployment, and undeployment of applications and application components are handled through the use of MBeans. During deployment of an application or application component, the Admin Server 225 searches for an MBean representing the currently selected file. In an embodiment, this search is conducted through a JNDI compliant naming service. If the Admin Server 225 finds a MBean for the file associated with the application or application component, then the application or application component is deployed on the application servers specified by the MBean. If no MBean is found, then a new MBean is created and the application or application component is deployed on application servers specified by the configuration file.

The embodiment shown in FIG. 3 may be employed with packaged files, such as a .JAR files, .EAR files, or .WAR files, or with unpackaged files, such as .class, .XML, .HTML, or .JSP files. In deploying or redeploying unpackaged files, the Admin Server 225 must not inadvertently deploy an incomplete application or application component. In creating or modifying an application or application component, a software developer may often alter several different source files in order to effect the necessary changes. When the required alterations on one of the files is complete, the date on this file will be immediately updated, which would signal to the Admin Server 225 that the application or application component associated with this file is ready for deployment. However, the required alterations to other files associated with the application or application component may not have been completed yet. Deploying an application or application component associated with these files at this point could result in an incomplete deployment. At the very least, this incomplete deployment wastes system resources. More serious consequences, such as system malfunctions and data corruption, may also result from incomplete deployment.

In order to prevent the inadvertent deployment of incomplete applications or application components, a further embodiment of the invention handles the deployment of unpackaged files differently from packaged files. Incomplete deployment is not possible with packaged files since the packaging step occurs after the creation or modification of all of the source files is complete. Therefore, in this embodiment, applications and application components associated with packaged files are deployed according to the process discussed in connection with FIG. 3.

With unpackaged files, the deployment and redeployment process is delayed until the user sets a deployment object. The deployment object signals to the Admin Server 225 that all the applications and application components associated with new or modified files are ready to be deployed or redeployed. In an embodiment, the deployment object may be a separate file. In an embodiment, the file has a predetermined name which is known by the Admin Server 225. The Admin Server 225 monitors an attribute of the deployment object. This attribute may be a property of the file, or its contents. By modifying the attribute of the deployment object, the user indicates to the Admin Server 225 that the creation or modification of files associated with an application or application component is complete, and the application or application component is ready for deployment.

In an embodiment, the deployment object is an empty or null file and the monitored attribute is the date associated with this null file. The user indicates that a application or application component is ready for deployment by updating the date on this null file. In many operating systems, this can be done with the 'touch' command. Upon updating the deployment object, the Admin Server 225 will deploy applications and application components associated with new, or newly modified, unpackaged files.

For unpackaged files, the process discussed in connection with FIG. 3 is modified as follows. If the Admin Server 225 determines the selected file should be deployed in Step 330, at Step 333, the Admin Server 225 first determines whether the selected file is a packaged file or an unpackaged file. An embodiment examines the selected file's extension to make this determination. In an embodiment adapted for J2EE applications, packaged files have file extensions such as .EAR, .JAR, and .WAR. Other file extensions may be used for packaged files as well.

If the selected file is not a packaged file, then the Admin Server 225 examines the deployment object. If the deployment object has not been updated by the user, then the deployment process is bypassed and the application or application components associated with the selected file are not deployed. Conversely, if the deployment object has been updated, then the applications or application components associated with the selected file are deployed by the Admin Server 225.

The deployment, undeployment, and redeployment of unpackaged applications and application components occur in a similar way as their packaged counterparts. In an embodiment, once the Admin Server 225 has determined that an unpackaged application or application component is ready to be deployed, the Admin Server 225 may automatically package all of the files associated with the application or application component into a packaged file prior to distribution to a server program. This automatic packaging is carried out without user intervention and facilitates distribution to the server program.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A computer implemented method of automatically deploying an application across a distributed computing domain including a plurality of processing devices, the method implemented using programmed instructions executed on a computer to do the steps of:
   (a) automatically scanning for an undeployed application stored in an application directory accessible to at least one of the plurality of processing devices, the application directory including at least one currently deployed application;
   (b) recognizing an undeployed application in the application directory; and
   (c) deploying the undeployed application to a selected portion of the plurality of processing devices, such that the application is capable of being executed by the portion of the plurality of processing devices; wherein
   when the undeployed application is placed in the application directory it is automatically deployed without requiring any other user step;
   wherein the method includes:
      obtaining a list of applications stored in the application directory;
      comparing the list of applications stored in the application directory to a list of previously deployed applications in order to select the application to be deployed; and
      deploying the selected application to the selected portion of the plurality of processing devices; and
   wherein the selected portion of the plurality of processing devices is determined from an analysis of a plurality of attributes associated with the undeployed application and a plurality of attributes associated with the distributed computing domain.

2. The method of claim 1, wherein the method further comprises the step of:
   selecting the application to be deployed from the list of applications stored in the application directory when the application is absent from the list of previously deployed applications.

3. The method of claim 1, wherein the method further comprises the step of:
   selecting the application to be deployed from the list of applications stored in the application directory when the value of a deployment indicator associated with the application differs from the value of a deployment indicator recorded on the list of previously deployed applications.

4. The method of claim 3, wherein:
   the deployment indicator is an attribute of a file containing the application.

5. The method of claim 4, wherein:
   the attribute of the file containing the application is the date of the file.

6. The method of claim 3, wherein:
   the deployment indicator is an attribute of a file associated with at least one separate file containing the application.

7. The method of claim 6, wherein:
   the attribute of the file associated with at least one separate file containing the application is the date of the file.

8. The method of claim 1, wherein:
   the step of scanning is initiated periodically after the passage of a predetermined time interval.

9. The method of claim 1, wherein:
   the undeployed application is comprised of a plurality of application components contained in a single file.

10. The method of claim 1, wherein:
    the undeployed application is comprised of a plurality of application components each contained in a separate file.

11. The method of claim 1, wherein:
    the undeployed application is a J2EE application.

12. An article of manufacture including an information storage medium wherein is stored information, the information comprising:
    a group of processor readable instructions adapted to operate on a processing device, wherein the group of processor readable instructions are adapted to operate the processing device according to the method of claim 1.

13. A computer implemented method of automatically maintaining an application object across a distributed computing domain, the application object contained within at least one application file and the distributed computing domain including a plurality of processing devices, the method implemented using programmed instructions executed on a computer to do the steps of:
    (a) retrieving a list of all of the application files located within an application directory;
    (b) comparing the list of all of the files located within an application directory to a list of all of the files associated with currently deployed application objects;
    (c) for each application file, deploying the application object contained in the application file when the application file is absent from the list of all the files associated with currently deployed application objects;
    (d) for each application file, redeploying the application object contained in the application file when the application file differs from the corresponding file on the list of all of the files associated with previously deployed application objects; and
    (e) for each application file on the list of all of the files associated with currently deployed application objects, undeploying the application object associated with an application file when the application file on the list of all of the files associated with currently deployed application objects is absent from the list of all of the application files located within the application directory; wherein
    when the undeployed application is placed in the application directory it is automatically deployed without requiring any other user step;
    wherein when an application is removed from the application directory it is undeployed without requiring any other user action;
    wherein the method includes:
        obtaining a list of applications stored in the application directory;
        comparing the list of applications stored in the application directory to a list of previously deployed applications in order to select the application to be deployed; and
        deploying the selected application to the selected portion of the plurality of processing devices; and
    wherein the selected portion of the plurality of processing devices is determined from an analysis of a plurality of attributes associated with the undeployed application and a plurality of attributes associated with the distributed computing domain.

14. The method of claim 13, wherein:
    in the step of redeploying, the difference is determined by comparing the value of a deployment indicator associated with an application file with the value of a deployment indicator recorded on the list of currently deployed application objects.

15. The method of claim 14, wherein:
    the deployment indicator is an attribute of a file containing the application object.

16. The method of claim 15, wherein:
    the attribute of the file containing the application object is the date of the file.

17. The method of claim 14, wherein:
    the deployment indicator is an attribute of a file associated with at least one separate file containing the application object.

18. The method of claim 17, wherein:
    the attribute of the file associated with at least one separate file containing the application object is the date of the file.

19. The method of claim 13, wherein:
    the step of retrieving is initiated periodically after the passage of a predetermined time interval.

20. The method of claim 13, wherein:
    the application object is a J2EE application.

21. The method of claim 13, wherein:
    the application object is a J2EE Enterprise Bean.

22. The method of claim 13, wherein:
    the application object is a Web component.

23. An article of manufacture including an information storage medium wherein is stored information, the information comprising:
    a group of processor readable instructions adapted to operate the processing device according to the method of claim 13.

24. A processing system including at least a first processing device and a memory device accessible by the first processing device, the processing system comprising:
- a group of processor readable instructions stored in the memory device and operating the first processing device to perform a group of steps including:
- (a) automatically scanning for an undeployed application stored in an application directory accessible to first processing device, the application directory including at least one currently deployed application;
- (b) recognizing an undeployed application in the application directory; and
- (c) deploying the undeployed application to a selected portion of the processing system, such that the application is capable of being executed by the portion of the processing system; wherein
- when the undeployed application is placed in the application directory it is automatically deployed without any requiring other user step;
- wherein the method includes:
  - obtaining a list of applications stored in the application directory;
  - comparing the list of applications stored in the application directory to a list of previously deployed applications in order to select the application to be deployed; and
  - deploying the selected application to the selected portion of the plurality of processing devices; and
- wherein the selected portion of the plurality of processing devices is determined from an analysis of a plurality of attributes associated with the undeployed application and a plurality of attributes associated with the distributed computing domain.

25. The processing system of claim 24, wherein:
the selected portion of the processing system includes the first processing device.

26. The processing system of claim 24, further including a second processing device in communication with the first processing device, wherein:
the selected portion of the processing system includes the second processing device.

27. The processing system of claim 26, wherein:
the first processing device and the second processing device are located on a first computer.

28. The processing system of claim 27, wherein:
the first processing device is located on a first computer; and
the second processing device is located on a second computer.

29. A processing system including at least a first processing device and a memory device accessible by the first processing device, the processing system comprising:
- a group of processor readable instructions stored in the memory device and operating the first processing device to perform a group of steps including:
- (a) retrieving a list of all of the application files located within an application directory, the application directory including at least one currently deployed application;
- (b) comparing the list of all of the files located within an application directory to a list of all of the files associated with currently deployed application objects;
- (c) for each application file, deploying the application object contained in the application file when the application file is absent from the list of all the files associated with currently deployed application objects;
- (d) for each application file, redeploying the application object contained in the application file when the application file differs from the corresponding file on the list of all of the files associated with currently deployed application objects; and
- (e) for each application file on the list of all of the files associated with currently deployed application objects, undeploying the application object associated with an application file when the application file on the list of all of the files associated with currently deployed application objects is absent from the list of all of the application files located within the application directory; wherein
- when the undeployed application is placed in the application directory it is automatically deployed without requiring any other user step;
- wherein when an application is removed from the application directory it is undeployed without requiring any other user action;
- wherein the method includes:
  - obtaining a list of applications stored in the application directory;
  - comparing the list of applications stored in the application directory to a list of previously deployed applications in order to select the application to be deployed; and
  - deploying the selected application to the selected portion of the plurality of processing devices; and
- wherein the selected portion of the plurality of processing devices is determined from an analysis of a plurality of attributes associated with the undeployed application and a plurality of attributes associated with the distributed computing domain.

30. The processing system of claim 29, wherein:
the application object is deployed on the first processing device.

31. The processing system of claim 29, further including a second processing device in communication with the first processing device, wherein:
the application object is deployed on the second processing device.

32. The processing system of claim 31, wherein:
the first processing device and the second processing device are located on a first computer.

33. The processing system of claim 31, wherein:
the first processing device is located on a first computer; and
the second processing device is located on a second computer.

34. A computer-implemented method for deploying applications to an application server, the method implemented using programmed instructions executed on a computer to do the steps of:
- automatically deploying an application to an application server when corresponding unpackaged application files are added to a smart directory;
- automatically undeploying the application when the corresponding unpackaged application files are removed from the smart directory; wherein
- when the undeployed application is placed in the application directory it is automatically deployed without requiring any other user step;
- wherein when an application is removed from the application directory it is undeployed without requiring any other user action;
- wherein the method includes:
  - obtaining a list of applications stored in the application directory;

comparing the list of applications stored in the application directory to a list of previously deployed applications in order to select the application to be deployed; and deploying the selected application to the selected portion of the plurality of processing devices; and wherein the selected portion of the plurality of processing devices is determined from an analysis of a plurality of attributes associated with the undeployed application and a plurality of attributes associated with the distributed computing domain.

35. The computer-implemented method of claim 34 wherein the unpackaged application files are automatically packaged before they are provided to the application server.

* * * * *

UNITED STATES PATENT AND TRADEMARK OFFICE
CERTIFICATE OF CORRECTION

PATENT NO. : 7,559,059 B2 Page 1 of 1
APPLICATION NO. : 09/960529
DATED : July 7, 2009
INVENTOR(S) : Benjamin Renaud It is certified that error appears in the above-identified patent and that said Letters Patent is hereby corrected as shown below:

On Title page, in Item (56), in column 2, under "Other Publications", line 15, delete "Patchinstallation" and insert -- Patch installation --, therefor.

In column 1, line 27, after "resources" insert -- . --.

In column 10, line 22, delete "URI"bar.jar"" and insert -- URI="bar.jar" --, therefor.

In column 11, line 51, delete "a" and insert -- an --, therefor.

Signed and Sealed this

Thirteenth Day of July, 2010

David J. Kappos
*Director of the United States Patent and Trademark Office*